United States Patent [19]

Pomazi

[11] 4,401,376
[45] Aug. 30, 1983

[54] FILM DESIGN AND IMPROVED CIRCUIT THEREFOR ENABLING UTILIZATION OF GREATER FILM EXPOSURE AREA

[76] Inventor: Laszlo Pomazi, 1323 12th St., Santa Monica, Calif. 90401

[21] Appl. No.: 358,028

[22] Filed: Mar. 15, 1982

[51] Int. Cl.³ .............................................. G03B 1/12
[52] U.S. Cl. .................................... 354/173; 354/213
[58] Field of Search ...................... 354/22, 23 R, 60 R, 354/171, 173, 206, 213, 217, 218; 355/41; 352/92; 353/26 R, 26 A; 226/24, 33, 43, 45; 242/188, 71.4, 71.5; 250/557, 561, 570, 571

[56] References Cited

U.S. PATENT DOCUMENTS 4,196,993 4/1980 Stemme et al. ...................... 354/173
4,304,480 12/1981 Fukahori et al. ................... 354/173

*Primary Examiner*—William B. Perkey
*Attorney, Agent, or Firm*—Thomas I. Rozsa

[57] ABSTRACT

An electronically controlled motor advance for film having light transmitting apertures along its edge that interact with a light source and a light sensitive switch for controlling the film advance motor. The usable film size is substantially increased by a unique method of advancing film which eliminates sprocket holes in conventional film.

2 Claims, 5 Drawing Figures

FILM DESIGN AND IMPROVED CIRCUIT THEREFOR ENABLING UTILIZATION OF GREATER FILM EXPOSURE AREA

BACKGROUND OF THE INVENTION

The present invention relates to an improved design for camera film such as 35 mm film wherein the amount of usable exposure area of the film is vastly increased without increasing the overall size of the film. The present invention also relates to an improved circuit design to enable utilization of the improved film. The present invention incorporates an electronically controlled motor advance for film having light transmitting apertures along its edge that interact with a light source and a light sensitive switch for controlling the film advance motor.

The field of inventions in the area of cameras and film therefor is very crowded and there are many pieces of prior art in this general field. However, none of these pieces of prior art incorporate the novel features of the present invention. U.S. Pat. No. 2,539,499 issued to Walters is representative of the relevant prior art and discloses film utilizing apertured margins that coact with electrical switches for controlling motor operation of the film advance. This patent concerns perforated film which is transported with a motor drive system. There is no film advance circuit and no utilization of Light Emitting Diodes or Germanium Photo Diodes to advance and stop the advance of the film.

Novak U.S. Pat. Nos. 3,848,987, Fischer et al 3,481,261, Iwata et al 4,084,169, Stemme et al 4,196,993 and Hosono 4,075,644 all disclose other electric drive film advance arrangements utilizing film perforation responsive switches. More specifically, U.S. Pat. No. 3,848,987 issued to Novak discloses a cassette type sequence camera which operates similar to the principal of a movie camera wherein the film contains two sets of sprocket holes. U.S. Pat. No. 3,481,261 issued to Fischer et al on a film magazine and camera therefor discloses a mechanism wherein a pin is activated by a spring and the pin jumps in the perforation of the film and mechanically breaks the circuit. U.S. Pat. No. 4,084,169 issued to Iwata et al discloses an automatic film advancing system that contains a switching circuit which connects the motor to a power source in response to the closing of a shutter after photographing, and a detector circuit which produces a signal to cause said switching circuit to break off the feeding of the current when the current continues longer than a preset length of time. The system incorporates a claw hooked in the perforation of the film and this serves to turn the electronic switch off which breaks the circuit. U.S. Pat. No. 4,196,993 issued to Stemme et al also utilizes a mechanical claw apparatus to break the film advance circuit at a predetermined time. Finally, U.S. Pat. No. 4,075,644 issued to Hosono on a motor drive means for motor driven single lens reflex camera also uses a comparable mechanical claw apparatus which hooks the appropriate perforations in the film and breaks the film advance circuit. None of the above patents disclose the use of a light source and an LED device for controlling the motor circuit.

The following patents do disclose various electro-optical arrangements for sensing film apertures used in a motor controlled circuit for controlling the advance motion of film or other web materials: Nakatani et at U.S. Pat. Nos. 4,207,473, Endicott Jr. et al 4,160,169, Rube et al 4,140,915 and Nellis 3,809,910. More specifically, U.S. Pat. No. 4,207,473 issued to Nakatani concerns a frame detection circuitry for a microfilm reader apparatus. The side of the film has light reflection points, not holes or perforations. When light strikes these points, it reflects the light to a sensor which in turn provides a signal to an amplifier. The system is designed so that after a certain number of signals from reflection of the marks on the film are received by the sensors and transmitted, the film advance circuit is broken. U.S. Pat. No. 4,160,169 issued to Endicott Jr. et al for a parallel scanning system discloses the use of microimages on the film which light projecting on them from above. A light sensor is under the film. The system is capable of sensing when a given space of the film is not occupied by a microimage and this in turn is transmitted into a signal which serves to break the advance circuit. U.S. Pat. No. 4,140,915 issued to Rube et al discloses yet another apparatus and method for sensing the perforations in a perforated strip. This patent discloses a microfilm reader and counter. Light is projected on the film from two different angles. Under the film is a hole with a covered mirror. The mirror reflects the light back to an optical sensor. Depending on the light angle, the machine can detect which way the film is moving. Finally, U.S. Pat. No. 3,809,910 issued to Nellis concerns microfilm frame selection circuitry. First and second photodetectors are positioned within a bridge configuration and are optically coupled to a control track of a roll of microfilm having optically readable control indicia positioned therein. Each frame passes through a viewing gate. Appropriate circuitry and signals enable a predetermined frame of the roll of microfilm to be positioned within the film gate. Therefore, although the above four patents disclose electro-optical arrangements for sensing film apertures, none of them are related to cameras and none incorporate the unique circuitry of the present invention.

U.S. Pat. No. 4,240,733 issued to Ueda does disclose a light measuring and automatic exposure control circuit in FIG. 5 on page 3. However, this is for use with regular 35 mm perforated film. The system contains a motor drive and the film is stopped by normal mechanical means. The LED in this circuit is just for showing on the outside of the camera that the engine and the motor drive is in action and the LED is not used to advance the film or break the circuit to stop the film advance.

Finally, U.S. Pat. No. 2,536,156 issued to Brownscombe discloses the use of apertureless film. The patent relates to a motion picture camera and the film is advanced through a mechanical spring actuating advance system containing a big arm which swings back and forth.

Therefore, although there are many patents in the prior art which relate to the field of the present invention in general, none of them incorporate a unique system utilizing a Light Emitting Diode and Germanium Photo Diode which electronically control the advance of the film through pin holes on the edge of the film. None of the prior art systems incorporate the use of apertureless film with an electronic film advance in still cameras such as 35 mm cameras.

SUMMARY OF THE PRESENT INVENTION

It has been discovered, according to the present invention, that if a length of photographic film can be advanced inside the camera from one exposure to the next by means of a multiplicity of pinholes adjacent one lengthwise edge and spaced apart from each other by equal predetermined distances, the use of large sprocket holes in the film to advance it is eliminated, thereby creating a greater amount of film exposure area and enabling utilization of greater film exposure area with conventional size film.

It has further been discovered, according to the present invention, that the improved photographic film design described above must be used in conjunction with a film advance circuit in order to properly advance the length of photographic film in the camera. Said film advance circuit should comprise at least a light emitting member such as a light emitting diode and a light sensing member such as a Germanium Photo Diode. The light emitting member and the light sensing member should be located in a substantially parallel plane such that the light sensing member can sense the light signal from the light emitting member if there is no barrier between them. The length of photographic film should be located between the light emitting member and the light sensing member such that the multiplicity of pinholes in the film are in substantially the same plane as the light emitting member and the light sensing member. The film advance circuit should further comprise a motor which is caused to operate and advance the length of the film within the camera while the length of film blocks light from passing from the light emitting member to the light sensing member and which is further caused to stop and prevent further advance of film within the camera when one of the multiplicity of pinholes is aligned with and permits light to pass from the light emitting member to the light sensing member.

It is therefore an object of the present invention to provide an improved photographic film design and an improved film advance circuit therefor enabling utilization of greater film exposure area with conventional size film and a conventional camera.

It is another object of the present invention to eliminate the use of sprocket holes in film such as 35 millimeter film to advance the length of film within a camera, and to substitute therefor a multiplicity of tiny pinholes which take up far less space on the film.

It is a further object of the present invention to provide an electronic circuit which can be used in conjunction with the multiplicity of pinholes in the length of film to automatically and electronically advance the film after each exposure to ready the film for the next exposure.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation there is illustrated:

DETAILED DESCRIPTION OF THE PREFERRED EMBODIMENT

Figure 2:
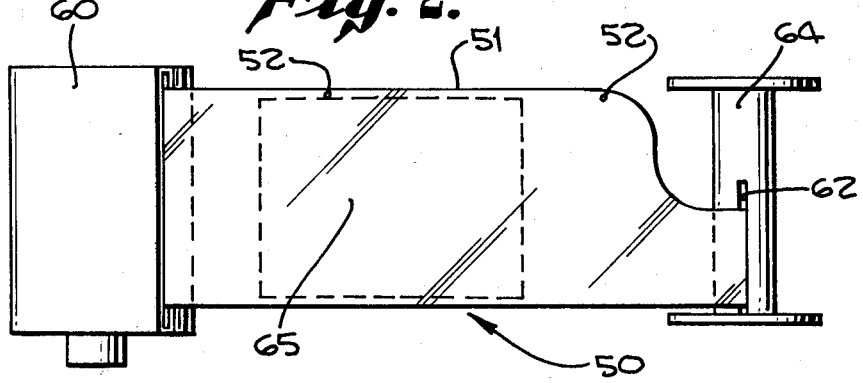
FIG. 2 is a side sectional view of the film of the present invention between the film spool and the take-up spool, taken along line 2—2 of FIG. 1.
Figure 4:
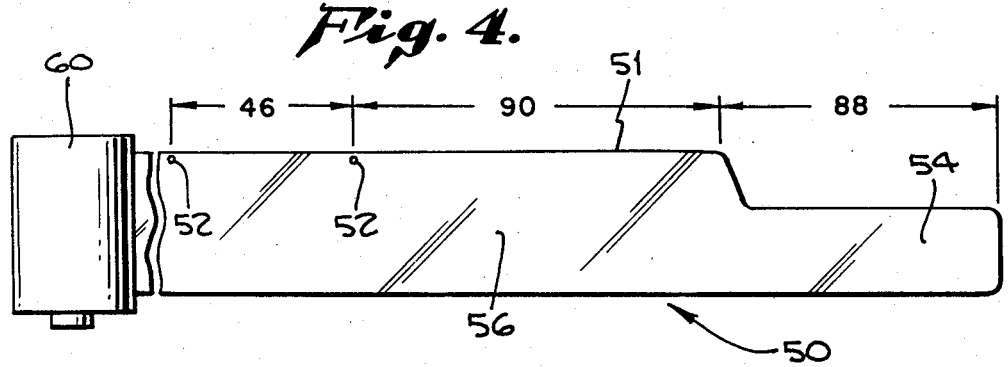
FIG. 4 is a side view of the present invention utilized in camera film such as 35 mm film.

With reference to the drawings of the invention in detail and more particularly to FIG. 4, there is shown at 50 the improved design for film such as 35 mm camera film. The improvement consists of increasing the size of the film area 56 which can be effectively utilized to take a picture while at the same time not increasing the overall size of the film 50. This improvement consists of a new structure for the physical advance mechanism in the film 50, as shown in FIG. 4 and also in FIG. 2. There is also an improvement in the film take-up method as shown in FIG. 2. The presently used film such as 35 mm camera film has sprocket holes running along its edge which engage the teeth of the take-up spool as the film is advanced after each exposure. In the case of 35 mm camera film, because of the size of the sprocket holes, the effective amount of each film which is used in a photograph is approximately 24 mm×36 mm. The improvement of the present invention in the film 50 consists of eliminating the sprocket holes and replacing them with pinholes 52. In the preferred embodiment for 35 mm camera film, the pinholes 52 are located adjacent one lengthwise edge and are spaced approximately 46 mm apart. As shown in FIG. 4, the lead edge of the film 54 can be approximately 88 millimeters and the distance from the end of the lead edge 54 to the first pinhole 52 can be approximately 90 millimeters.

As shown in FIG. 2, the film 50 which comes in film casing 60 is placed into slot 62 of take-up spool 64 such that lead edge 54 enters slot 62 and the film is mechanically wound until the balance of lead edge 54 has been inserted into take-up spool 64. The film is then ready to be wound electronically in order to bring the first exposure area 65 into the plane of the lens.

Figure 1:
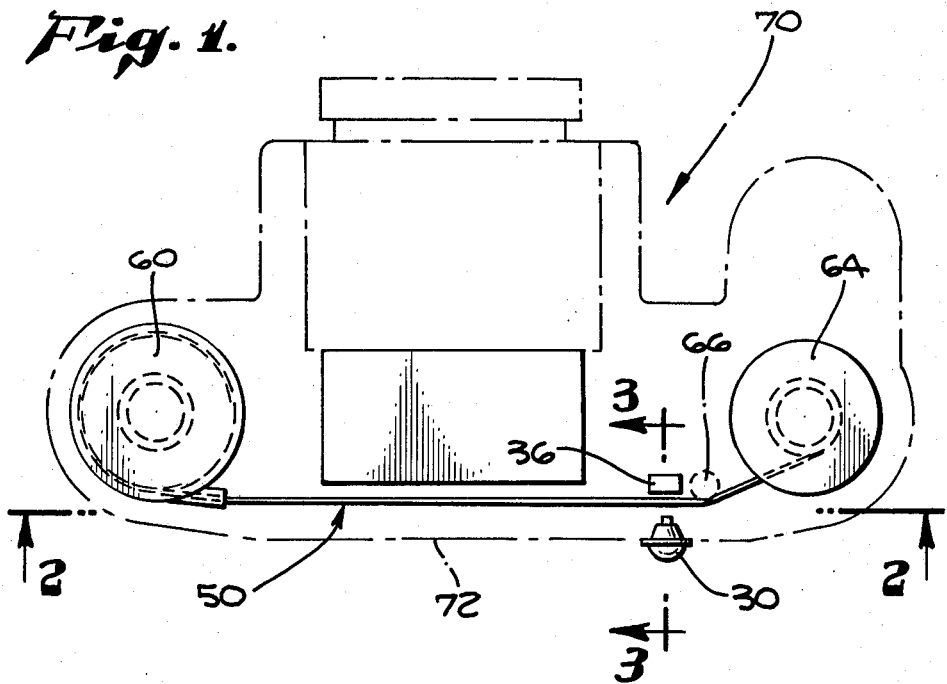
FIG. 1 is a top plan view of a camera with the film utilizing the present invention in plane and illustrating one possible position of the Light Emitting Diode and the Germanium Photo Diode relative to the film plane.
Figure 3:
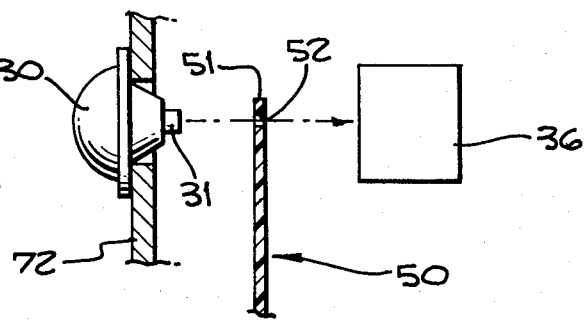
FIG. 3 is a cross-sectional view taken along line 3—3 of FIG. 1, illustrating the Light Emitting Diode (hereinafter called "LED") and the Germanium Photo Diode (hereinafter called "GPD") relative to the film plane.

A standard 35 mm camera 70 is shown in FIG. 1, The positions of the film casing 60, a feed roller 66, and take-up spool 64 are located in their ordinary positions within camera 70. An additional improvement in the present invention consists of the addition of the LED 30 which generates a light source and the GPD 36 which is in the same plane as the LED and spaced apart from it. The GPD 36 can therefore sense the light emitted by the LED 30 if there is no partition between them. As shown in FIG. 1 and in the cross-sectional view of FIG. 3, the film 50 runs between the LED 30 and the GPD 36 such that the upper edge 51 of the film 50 comes between the light emitting source 31 of the LED 30 and the GPD 36. The pinholes 52 in the film 50 are spaced from the upper edge 51 by a sufficient distance so that the pinholes 52 are in the same plane as the light emitting source 31 from the LED 30. Therefore, light from the LED 30 can pass to the GPD 36 when a pinhole 52 arrives at the location of the LED 30 and GPD 36. As will be discussed below, after the film 50 is wound into take-up spool 64, the camera door 72 is then closed to activate the film circuit.

Figure 5:
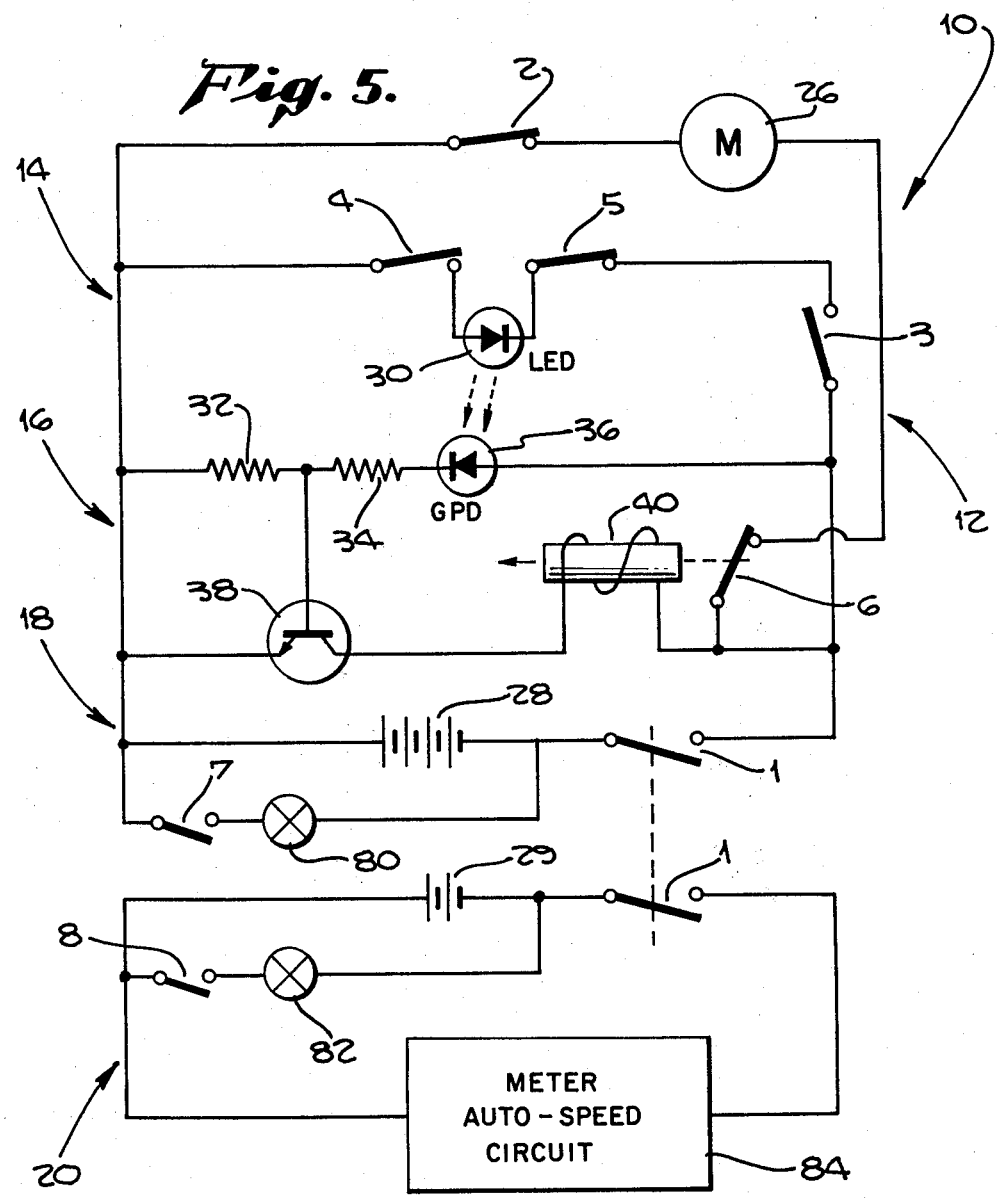
FIG. 5 is a circuit diagram of the electronic circuit of the present invention.

With reference to FIG. 5, there is shown at 10 the circuit diagram of the electronic circuit of the present invention. The circuit contains eight (8) switches numbered 1 (a double switch), 2, 3, 4, 5, 6, 7, and 8. The major subelectronic circuits of the present invention are the motor circuit 12, first interior circuit 14, and second interior circuit 16. The motor circuit 12 contains switch 1, switch 6, and switch 2, as shown in FIG. 5. Located on one part of the circuit between switch 6 and switch 2 is motor 26. Located on the opposite part of the circuit between switch 2 and switch 1 is a battery 28. The first interior circuit 14 contains switches 3, 4, and 5. Also located in interior circuit 12 is the LED 30 between switches 4 and 5. Additionally located in interior circuit 12 between switch 4 and switch 3 in series from switch 4 to switch 3 are first resistor 32, second resistor 34 and the GPD 36. As previously mentioned, the GPD 36 is substantially in the same plane as the LED 30 so that the GPD 36 can sense light from the LED 30 if there is no physical barrier between them. The second interior circuit 16 contains first resistor 32, second resistor 34 and GPD 36 from first interior circuit 12. Also located in second interior circuit 16 running in series between first resistor 32 and GPD 36 and from first resistor 32 to GPD 36 are a transmitter 38, a solenoid 40, and switch 6.

At the beginning of the cycle, switch number 6 is in the closed position. Switches 2, 4 and 5 can be located in the back cover 72 of the camera body 70. When the back cover 72 of the camera 70 is closed, switches 2, 4 and 5 are simultaneously closed. Switch 1 is the electronic main switch located on the outside of the camera 70 and is manually closed by the photographer. When switch 1 is closed, the motor circuit 12 is thereby closed. As previously mentioned, the circuit consists of switch 1, switch 6, the motor 26, switch 2, and battery 28. When the motor circuit 12 is thereby closed, the motor 26 begins to run. As the motor 26 runs, it causes the film 50 to advance. As with conventional motor drive systems, the motor 26 cocks the shutter of the camera (not shown) which in turn is attached to a conventional mirror box of the camera (also not shown). Switch number 3 is attached to the camera mirror box and then the shutter is thereby cocked, switch 3 is closed. When switch 3 is thus closed, first interior circuit 14 is closed and the LED 30 receives power, thereby transmitting a beam of light. As previously discussed, the plane of the film 50 is located between the LED 30 and the GPD 36 and therefore the GPD 36 does not sense this light. The film 50 continues to advance until pinhole 52 arrives in front of the LED 30. The pinhole 52 permits the light to pass from the LED 30 to the GPD 36. When the GPD 36 senses the light, it activates second interior circuit 16. The GPD 36 activates the transistor 38 which in turn causes solenoid 40 to move and open switch 6. This breaks the motor circuit 12 and causes the motor 26 to stop which in turn causes the film 50 to stop advancing.

At this point, the camera 70 is ready for exposure. The exposure is made and the conventional camera shutter and mirror box are released from their cocked positions. As a result, switch number 3 is opened and first interior circuit 14 is broken. This turns the LED 30 off and it no longer generates the beam of light. As a result, the GPD 36 no longer senses the beam of light and this deactivates second interior circuit 16. The transistor 38 ceases to conduct, solenoid 40 is turned off and therefore switch 6 is permitted to close once again. When switch 6 is closed, the motor circuit 12 is once again activated. The film continues to advance and at the same time the motor 26 cocks the shutter and the mirror box which in turn causes switch 3 to close again. Similarly, the entire cycle is repeated.

The circuit 10 also contains two auxiliary circuits which are not essential to the present invention but are desirable for a proper product. Battery testing circuit 18 contains battery 28, switch 7 and control light 80. When switch 7 is closed, the control light 80 indicates if battery 28 is operating properly. Exposure meter circuit 20 contains a second battery 29, light 82. The exposure meter circuit 20 is connected to the exposure meter 84. When switch 8 is closed, the second control light 82 indicates if the exposure meter 84 is working properly.

By elimination of the sprocket advance holes used in conventional film and replacement by the pinholes 52 in the film along with the electronic circuit described above, the amount of film which can be utilized for each picture is vastly increased. For example, in the case of 35 mm film, the conventional film with standard sprocket holes utilizes a picture area of approximately 24 mm $\times$ 36 mm or 864 mm$^2$ for each exposure. By utilization of the present invention with pinholes in the film, the picture area that can be utilized for each exposure is increased to approximately 33 mm $\times$ 44 mm or 1452 mm$^2$ without increasing the overall size of the film. This represents approximately a sixty eight percent (68%) increase in the amount of exposable film in each picture. With this increase, much sharper pictures can be taken and much larger clear prints can be made.

The present invention can be incorporated into a multiplicity of film sizes, and is not limited to 35 mm film or 35 mm film cameras. It is particularly applicable to 35 mm film because the film size is small to begin with and the sixty eight percent (68%) increase in usable exposure area is a vast improvement over the prior art. The electronic circuit of the present invention can also be incorporated in a multiplicity of different cameras and is not limited to only 35 mm cameras.

In the disclosure, the pinholes 52 were shown adjacent the upper edge of the film. It is also within the spirit and scope of the present invention to place these pinholes adjacent the lower edge of the film. The exact location of the Light Emitting Diode 30 and the Germanium Photo Diode 36 is not fixed and they may be moved to a location other than the one disclosed herein, provided they are aligned with the pinholes in the film as previously discussed.

The present invention is not limited to use of only a Light Emitting Diode 30 and Germanium Photo Diode 36. Other electronic components which generate a light source can be substituted for the Light Emitting Diode 30 and other electronic components which can sense a light source can be substituted for the Germanium Photo Diode 36. Also, an electronic component other than solenoid 40 can also be used to open and close switch 6.

Of course, the present invention is not intended to be restricted to any particular form or arrangement, or any specific embodiment disclosed herein, or any specific use; since the same may be modified in various particulars or relations without departing from the spirit or scope of the claimed invention hereinabove shown and described of which the apparatus shown is intended only for illustration and for disclosure of an operative embodiment, not to show all of the various forms of modification in which the invention might be embodied.

The invention has been described in considerable detail in order to comply with the patent laws by providing a full public disclosure of at least one of its forms.

However, such detailed description is not intended in any way to limit the broad features or principles of the invention, or the scope of the patent monopoly to be granted.

What is claimed is:

1. An improved photographic film design and improved film advance circuit therefor enabling utilization of greater film exposure area with conventional size film and a conventional camera comprising:
   a. a length of photographic film containing a multiplicity of pinholes adjacent one lengthwise edge and spaced apart from each other by equal predetermined distances;
   b. a film advance circuit used in conjunction with said length of photographic film;
   c. said film advance circuit comprising a motor circuit, a first interior circuit, and a second interior circuit;
   d. said motor circuit comprising a first switch, a second switch, and a third switch;
   e. said motor circuit further comprising a motor between said second switch and said third switch, and a battery between said third switch and said first switch;
   f. said first interior circuit comprising a first switch, a second switch, and a third switch;
   g. said first interior circuit further comprising a light emitting diode located between said first switch and said second switch, and a first resistor, a second resistor, and a Germanium photo diode located between said second switch and said third switch;
   h. said second interior circuit comprising said first resistor, and said second resistor, and said Germanium photo diode of said first interior circuit;
   i. said second interior circuit further comprising a transistor, a solenoid, and said second switch of said motor circuit, all located between said first resistor and said Germanium photo diode;
   j. said light emitting diode and said Germanium photo diode being located in a substantially parallel plane such that the Germanium photo diode can sense the light signal from the light emitting diode if there is no barrier between them;
   k. said length of photographic film being located between said light emitting diode and said Germanium photo diode such that said multiplicity of pinholes in the photographic film are in substantially the same plane as the light emitting diode and the Germanium photo diode;
   l. said second switch of said motor circuit being in a normally closed position;
   m. said third switch of said motor circuit and said first and second switch of said first interior circuit being located such that they are closed when the camera body is closed; and
   n. said first switch of said motor circuit being capable of manual closure by the operator;
   o. whereby after said camera is closed and said first switch is manually closed, said motor circuit is thereby closed and said motor begins to run and causes said length of photographic film to advance within said camera and cock the shutter and mirror box of the conventional camera which thereby closes the third switch of said first interior circuit, whereby said first interior circuit is closed and the light emitting diode receives power thereby transmitting a beam of light and when a pinhole arrives in front of the light emitting diode light is allowed to pass to the Germanium photo diode which senses the light and activates and second interior circuit which thereby activates said transistor which in turn causes said solenoid to move and open said second switch of said motor circuit, thereby causing the motor circuit to be opened and the motor to stop running which in turn causes the length of photographic film to stop advancing and ready the film for exposure, and after the exposure is made the camera shutter and mirror box are released from their cocked position and as a result the third switch of said first interior circuit is opened, the first interior circuit is thereby broken, the light emitting diode is thereby turned off which in turn causes the Germanium photo diode to be deactivated so that the transistor ceases to conduct and the solenoid is turned off, thereby allowing the second switch of said motor circuit to return to its closed position to thereby close said motor circuit and permit the cycle to begin again, therefore the multiplicity of pinholes in the film in conjunction with the film advance circuit permits the length of film to be advanced from one exposure to the next and the use of large sprocket holes in the film to advance it is eliminated, thereby creating a greater amount of film exposure area and enabling utilization of greater film exposure area with conventional size film.

2. The invention as defined in claim 1 wherein said photographic film is 35 millimeter film and said multiplicity of pinholes are spaced 46 millimeters apart.

* * * * *